March 18, 1958 A. J. ROSENBERGER 2,826,913
FLUID MASS FLOW MEASURING APPARATUS
Filed Aug. 30, 1954

INVENTOR.
Albert J. Rosenberger,
BY
Clair Freeman & Molinare
ATTORNEYS.

United States Patent Office 2,826,913
Patented Mar. 18, 1958

2,826,913

FLUID MASS FLOW MEASURING APPARATUS

Albert J. Rosenberger, Chicago, Ill., assignor, by mesne assignments, to Republic Flow Meters Company, Chicago, Ill., a corporation of Delaware Application August 30, 1954, Serial No. 452,990

6 Claims. (Cl. 73—205)

This invention relates to a fluid mass flow measuring apparatus and more particularly to apparatus for measuring both the density of a flowing fluid and the volumetric rate of flow thereof and combining such measurements to obtain an indication of the mass of fluid flowing.

Heretofore, it has been the usual practice to measure the volumetric rate of flow of a fluid and either estimate an average density or correct for pressure changes. While the desirability of correction for density has been recognized, accurate measurement of density has been difficult to obtain and has presented a number of difficulties in applying as a correction or combining factor to the volumetric flow measurement.

It is one of the objects of the present invention to provide a measuring apparatus in which density of the flowing fluid is acurately and simply measured and is combined with the volumetric flow measurement continuously to give a continuous indication of the mass flow rate.

Another object is to provide a measuring apparatus in which a factor proportional to the square root of density is combined with a factor proportional to the volumetric rate of flow to obtain an accurate and continuous indication of the mass rate of flow.

A further object is to provide a measuring apparatus in which measurements representative of different factors are combined through a simple linkage which also extracts the square root of a factor representative of flow and responsive to the pressure drop across an orifice or restriction.

Figure 1:
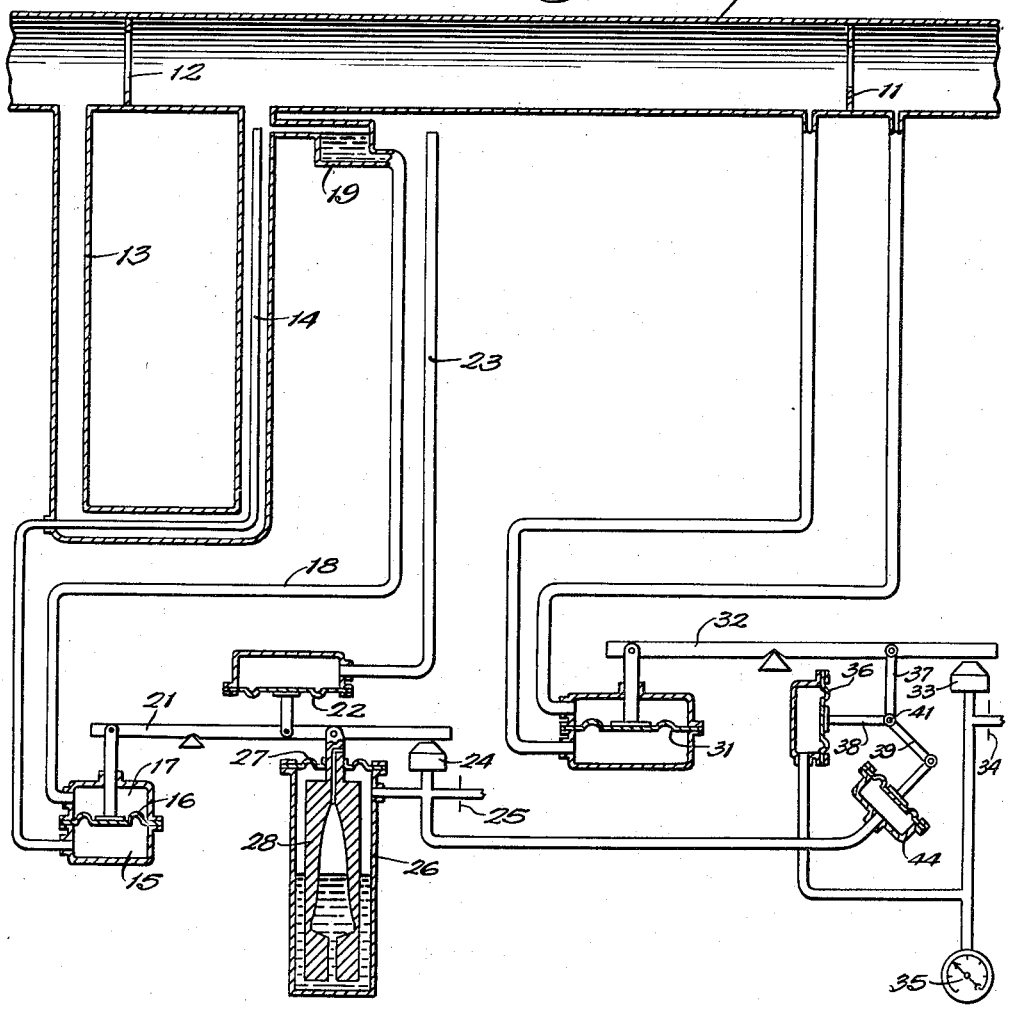
Figure 2:
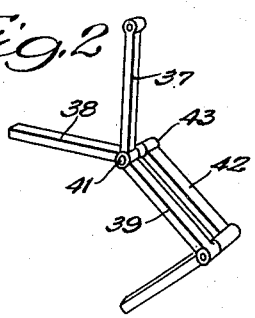

The above and other objects and features of the invention will be more readily apparent from the following description when read in connection with the accompanying drawing, in which:

Figure 1 is a diagrammatic view with parts shown in section of an apparatus embodying the invention; and Figure 2 is a partial perspective view of the force combining linkage of Figure 1.

In the apparatus of Figure 1, it is desired to obtain a measurement of the mass rate of flow of a fluid, such as steam, through a conduit 10. The conduit is provided with a measuring orifice 11, the drop across which is utilized to measure the volumetric rate of flow, and with a second orifice 12 which is provided to create a secondary flow of steam through a loop 13 connected across the orifice 12.

The loop 13 forms a part of a mechanism for continuously and accurately measuring the density of the flowing fluid which will be assumed to be steam, although it could be any other desired fluid. Due to the effect of the orifice 12, a small secondary flow of steam will be created through the loop 13 to maintain the pressure and temperature conditions in the loop the same as those existing in the main conduit 10. A tube or pipe 14 extends through one of the vertical legs of the loop 13 and is open at its upper end so that it will contain steam at the same temperature and pressure as the steam in the conduit. The weight of the column of steam in the tube 14 accurately represents the density of the steam in the main conduit and is utilized to produce a controlling force representative of density.

For this purpose, the lower end of the tube 14 is connected to a chamber 15 closed at its upper side by a flexible diaphragm 16. It will be understood that the portion of the tube 14 outside of the loop 13 may be filled with water, as is common in instruments of this type, but that the vertical portion of the tube 14 which lies within the loop 13 will contain the column of steam which is to be weighed.

To cancel static pressure the upper side of the diaphgram 16 is enclosed by a chamber 17 which is connected through a tube 18 and a constant level chamber 19 to the loop 13 adjacent the open upper end of the tube 14. Static pressure in the loop will be transmitted through both the tube 14 and the tube 18 to opposite sides of the diaphragm 16 so that it will effectively cancel. The tube 18 will be maintained full of water up to a predetermined constant level, as shown, as is customary in the art.

The diaphragm 16 is connected to a balance beam 21 normally to urge it clockwise in response to the weight of the column of steam in the tube 14. To cancel the effective weight of the column of water in the tube 18, a second diaphragm 22 acts on the beam 21 opposite to the diaphragm 16 as loaded by the water in the tube 18. The diaphragm 22 is connected to a vertical tube 23 which is maintained full of water at the same level as the tube 18 so that it will cancel the head of water in the tube 18. The relative areas of the diaphragms may be proportioned to compensate for any difference in the total length of the water columns and for the water in the tube 14 or, if desired, the several diaphragms could be positioned at the same level so that no compensation is necessary. In any event, the net effect of the forces acting on the diaphragms 16 and 22 is to cancel all of the factors except the weight of the column of steam in the tube 14 which is accurately representative of the density of the steam flowing through the main conduit 10.

The next effect of the weight of the column of steam acting on the diaphragm 16 is to urge the beam 21 clockwise toward a nozzle 24 which is supplied with compressed air past a restriction 25. The nozzle is connected to a chamber 26 closed at its upper end by a diaphragm 27 which is connected to the beam 21 to urge it counter-clockwise. With this construction, the nozzle 24 will be controlled to produce a pressure acting on the diaphragm 27 which will balance the force exerted by the diaphragm 16 and which is therefore proportional to the density of the steam.

Since the mass flow rate varies as the square root of the density with a constant differential pressure across the flow orifice, it is desired to provide a controlled output pressure from the nozzle 24 which is proportional to the square root of the density, as represented by the weight of the column of steam in the tube 14. For this purpose, a hollow displacer 28 having a chamber shaped so that its volume changes in proportion to a square root function is mounted in the chamber 26 connected to the diaphragm 27 with its internal chamber vented to atmosphere through the connecting stem, as shown. The chamber 26 is partially filled with a liquid, such as mercury, which will be displaced more or less into the cavity in the displacer 28 as the pressure back of the nozzle 24 varies. Thus the effective weight of the displacer suspended from the diaphragm 27 will be varied as the pressure varies and by proper design of the displacer chamber, the variation can be made to correspond to a square root function. Thus the pressure produced by the nozzle 24 will vary with the square root of the density of the steam.

Volumetric rate of flow is measured by connecting opposite sides of the flow orifice 11 to opposite sides of a flexible diaphragm 31 which is connected to a balance beam 32 to urge it clockwise in response to flow. The beam 32 controls a pressure nozzle 33 which is supplied with air pressure past a restriction 34. The pressure back of the nozzle 33, which will correspond to the mass rate of flow, may be connected to an indicator 35 or to any desired control device and is also supplied to a diaphragm 36 which exerts a horizontal force parallel to the beam 32.

The diaphragm 36 is connected to the beam 32 through a lever system including levers 37, 38 and 39 pivotally interconnected at 41. The lever 37 is connected to the beam 32 and lies normal thereto. The lever 38 is connected to the diaphragm 36 to be moved thereby. The lever 39 constitutes a reaction lever and is pivotally supported at its free end by a supporting lever 42 pivoted on a fixed pivot 43 which is coaxial with the pivot 41 when the levers are in their balanced condition. The lower end of the supporting lever 42 is shifted by a diaphragm unit 44 which is connected to the nozzle 24 to be responsive to the square root of density.

With the lever 39 extended at an angle to the levers 37 and 38, as shown, the force exerted on the lever 38 by the bellows 36 will tend to push the lever 37 upward. Due to the angular arrangement of the levers, the upward force exerted by the lever 37 will be proportional to a sine function, which through the normal operating angles corresponds closely to a square curve. The levers therefore will compensate for the fact that the pressure drop across the orifice 11 varies as the square of the flow so that the pressure produced at the nozzle 33 will vary substantially with the volumetric flow through orifice 11.

The angle of the lever 39 will be adjusted in accordance with density variations to compensate the volumetric flow rate for density variations. As the angle of the lever 39 is changed, the effect of the force exerted by the diaphragm 36 will be altered so that the actual pressure produced at the nozzle 33 will be proportional to the product of volumetric flow rate and the square root of the density. This pressure will therefore accurately represent the mass flow rate of the fluid instantaneously and continuously.

While one embodiment of the invention has been shown and described in detail, it will be understood that this is for the purpose of illustration only and is not to be taken as a definition of the scope of the invention, reference being had for this purpose to the appended claims.

What is claimed is:

1. A fluid mass flow measuring apparatus comprising a conduit through which the fluid may flow, means for weighing a column of the fluid flowing through the conduit, an instrument connected to the last named means to produce a controlling force proportional to a function of the density of the fluid, means responsive to the flow of fluid through the conduit to produce a second force proportional to a function of the rate of flow, a balance member, means responsive to the second force to urge the balance member in one direction, means responsive to movement of the balance member to produce a regulated force, measuring means responsive to the regulated force, a force responsive device connected to the means responsive to movement of the balance member to respond to the regulated force, a force responsive device responsive to the first named controlling force, and an adjustable linkage connecting both of said force responsive devices to the balance member to urge it in the other direction in proportion to a joint function of the first named controlling force and the regulated force.

2. A fluid mass flow measuring apparatus comprising a conduit through which the fluid may flow, means for weighing a column of the fluid flowing through the conduit, an instrument connected to the last named means to produce a controlling force proportional to a function of the density of the fluid, means responsive to the flow of fluid through the conduit to produce a second force proportional to a function of the rate of flow, a balance member, means responsive to the second force to urge the balance member in one direction, means responsive to movement of the balance member to produce a regulated force, measuring means responsive to the regulated force, a force responsive device connected to the means responsive to movement of the balance member to respond to the regulated force, an adjustable linkage connecting the force responsive device to the balance member to urge it in the other direction, and means responsive to the first named controlling force to adjust the linkage thereby to vary the mechanical advantage between the force responsive device and the balance member.

3. A fluid mass flow measuring apparatus comprising a conduit through which the fluid may flow, means for weighing a column of the fluid flowing through the conduit, an instrument connected to the last named means to produce a controlling force proportional to a function of the density of the fluid, means responsive to the flow of fluid through the conduit to produce a second force proportional to a function of the rate of flow, a balance member, means responsive to the second force to urge the balance member in one direction, means responsive to movement of the balance member to produce a regulated force, measuring means responsive to the regulated force, a force responsive device connected to the means responsive to movement of the balance member to respond to the regulated force, the device exerting a force parallel to the balance member, a link normal to the line of force of the device and to the balance member connecting the device to the balance member, a reaction link pivoted to the last named link, and a force responsive device responsive to the first named controlling force to change the angle of the reaction link.

4. A fluid mass flow measuring apparatus comprising a conduit through which the fluid may flow, means for weighing a column of the fluid flowing through the conduit, an instrument connected to the last named means to produce a controlling force proportional to the square root of the weight of the column of fluid, a balance member, means responsive to the volumetric rate of flow through the conduit to urge the balance member in one direction, means responsive to movement of the balance member to produce a regulated force, measuring means responsive to the regulated force, means responsive to the regulated force to urge the balance member in the other direction, and means responsive to the controlling force to vary the effect of the last named means on the balance member.

5. A fluid mass flow measuring apparatus comprising a conduit through which the fluid may flow, means for weighing a column of the fluid flowing through the conduit, an instrument connected to the last named means to produce a controlling force proportional to the square root of the weight of the column of fluid, a balance member, means forming a restriction in the conduit, means responsive to the pressure drop across the restriction urging the balance member in one direction, means responsive to movement of the balance member to produce a regulated force, measuring means responsive to the regulated force, a pressure responsive device connected to the means responsive to movement of the balance member to respond to the regulated force and exerting a force proportional to the regulated force parallel to the balance member, three pivotally interconnected links one of which is connected at right angles to the balance member, the second of which lies at right angles to the first and is connected to the pressure responsive device, and the third of which is a reaction link, and means responsive to the controlling force to change the angle of the reaction link relative to the first and second links.

6. In a measuring apparatus, a balance member, means responsive to a function of a condition to be measured to urge the balance member in one direction, means responsive to movement of the balance member to produce a regulated force, a force producing device connected to the last named means and responsive to the regulated force, a linkage including three links pivotally interconnected at one end at a comon pivotal axis two of the links lying at an angle to each other and being connected respectively to the balance member and the force producing device for exertion of forces lengthwise of said two links and the third link constituting a reaction link, and means responsive to a second function of said condition to adjust the angle of the reaction link about the common pivotal axis relative to said two of the links.

References Cited in the file of this patent

UNITED STATES PATENTS

| | | |
|---|---|---|
| Re. 23,723 | Allwein | Oct. 13, 1953 |
| 2,279,255 | Luhrs | Apr. 7, 1942 |
| 2,409,871 | Krogh | Oct. 22, 1946 |
| 2,521,477 | Pellettere | Sept. 5, 1950 |
| 2,612,908 | Tate et al. | Oct. 7, 1952 |
| 2,652,813 | Stresen-Reuter et al. | Sept. 22, 1953 |
| 2,672,151 | Newbold | Mar. 16, 1954 |
| 2,736,199 | Ibbott | Feb. 28, 1956 |